(12) United States Patent
Philips et al.

(10) Patent No.: US 6,438,308 B1
(45) Date of Patent: Aug. 20, 2002

(54) UPGRADEABLE CONNECTOR MODULE FOR USE IN A FIBER ADMINISTRATION SYSTEM

(75) Inventors: Wade Charles Philips, Omaha, NE (US); Richard Joseph Pimpinella, Hampton, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/163,928

(22) Filed: Sep. 30, 1998

(51) Int. Cl.[7] ................................. G02B 6/36
(52) U.S. Cl. ................ 385/135; 385/134; 385/139; 385/24
(58) Field of Search ................ 385/24, 53, 59, 385/88, 89, 134, 135, 139

(56) References Cited

U.S. PATENT DOCUMENTS

| | | | | |
|---|---|---|---|---|
| 5,353,367 A | * | 10/1994 | Czosnowski et al. | 384/135 |
| 5,394,503 A | * | 2/1995 | Dietz, Jr. et al. | 385/135 |
| 5,793,909 A | * | 8/1998 | Leone et al. | 385/24 |
| 6,002,331 A | * | 12/1999 | Laor | 385/135 |
| 6,208,796 B1 | * | 3/2001 | Vigliaturo | 385/135 |
| 6,222,975 B1 | * | 4/2001 | Gilbert et al. | 385/134 |
| 6,256,445 B1 | * | 7/2001 | Jennings et al. | 385/135 |

* cited by examiner

Primary Examiner—Hemang Sanghavi
(74) Attorney, Agent, or Firm—Gibbons, Del Deo, Dolan, Griffinger & Vecchione

(57) ABSTRACT

An assembly for use in a fiber administration system that retroactively adds a fiber location trace ability to the fiber administration system. The assembly includes an improved connector module that has a receptacle formed near a plurality of optical connector ports. An upgrade tracing module is provided that fits into the receptacle and attaches to the connector module. The upgrade tracing module contains a plurality of lights. When the upgrade tracing module is connected to the connector module, the lights of the upgrade tracing module or oriented near each of the optical connector ports. The upgrade tracing module connects to the systems controller of the fiber administration system through the connector module. As such, the systems controller of the fiber administration system is capable of selectively lighting the lights and identifying a specific optical connector port.

13 Claims, 3 Drawing Sheets

UPGRADEABLE CONNECTOR MODULE FOR USE IN A FIBER ADMINISTRATION SYSTEM

BACKGROUND OF THE INVENTION

1. Field of the Invention

The present invention relates to connector modules used to terminate and interconnect optical fibers in a fiber administration system. More particularly, the present invention relates to connector modules containing illuminated indicators that help a technician locate a specific connector module port in a bank of connector modules.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are connection modules that receive the ends of all of the individual optical fibers that enter the central office and are contained within the optical fiber network. By terminating each optical fiber at a connection module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

A fiber distribution system may contain dozens of fiber distribution shelves. A typical fiber distribution shelf holds twelve connector modules. Each connector module many have six to nine optical connector ports that lead to an optical fiber in the network. Accordingly, a fiber distribution system may contain hundreds or thousands of optical connector ports.

In order to maintain the quality and integrity of the fiber administration system, the various optical fibers are periodically disconnected from the optical network and are connected to various types of test equipment. Additionally, as the fiber network grows, certain optical fibers get rerouted within the fiber administration system. It is often difficult for a technician to find a specific optical connector port in the hundreds of optical connector ports available in a fiber administration system. Accordingly, it is not uncommon for a technician to accidentally select the wrong optical connector port and disrupt an optical fiber pathway that should not have been disrupted.

In an attempt to assist a technician in finding a specific optical connector port, tracing systems have been developed that provide a visible indication as to the location of a targeted optical connector port. Such prior art tracing systems are exemplified by U.S. Pat. No. 5,448,675 to Leone, entitled Telecommunications Distribution Frame With Tracing. In such systems, a light is lit next to the optical connector port being targeted. A technician can see the light and is immediately led to the targeted optical connector port. The light is an LED that is positioned next to each of the optical connector ports. The LEDs are built into the connector modules that support the optical connector ports.

In systems that do use an optical connector port tracing system, there are no LEDs built into the connector modules. As a result, in order to convert an ordinary fiber administration system into one that uses an optical connector port tracing system, each and every connector module in the fiber administration system must be replaced. Such a conversion procedure is very time consuming, labor intensive and expensive.

Certain customers of fiber administration systems are therefore forced to either select a fiber administration system with an expensive optical connection port trace system that they do not yet need, or select a less expensive fiber administration system without a trace system that may require an expensive upgrade in the future.

A need therefore exists for an apparatus and method that would enable an optical connection port tracing system to be retroactively added to a fiber administration system in a cost effective and labor efficient manner.

SUMMARY OF THE INVENTION

The present invention is an assembly for use in a fiber administration system that retroactively adds a fiber location trace ability to the fiber administration system. The assembly includes an improved connector module that has a receptacle formed near a plurality of optical connector ports. An upgrade tracing module is provided that fits into the receptacle and attaches to the connector module. The upgrade tracing module contains a plurality of lights. When the upgrade tracing module is connected to the connector module, the lights of the upgrade tracing module are oriented near each of the optical connector ports. The upgrade tracing module connects to the systems controller of the fiber administration system through the connector module. As such, the systems controller of the fiber administration system is capable of selectively lighting the lights and identifying a specific optical connector port.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
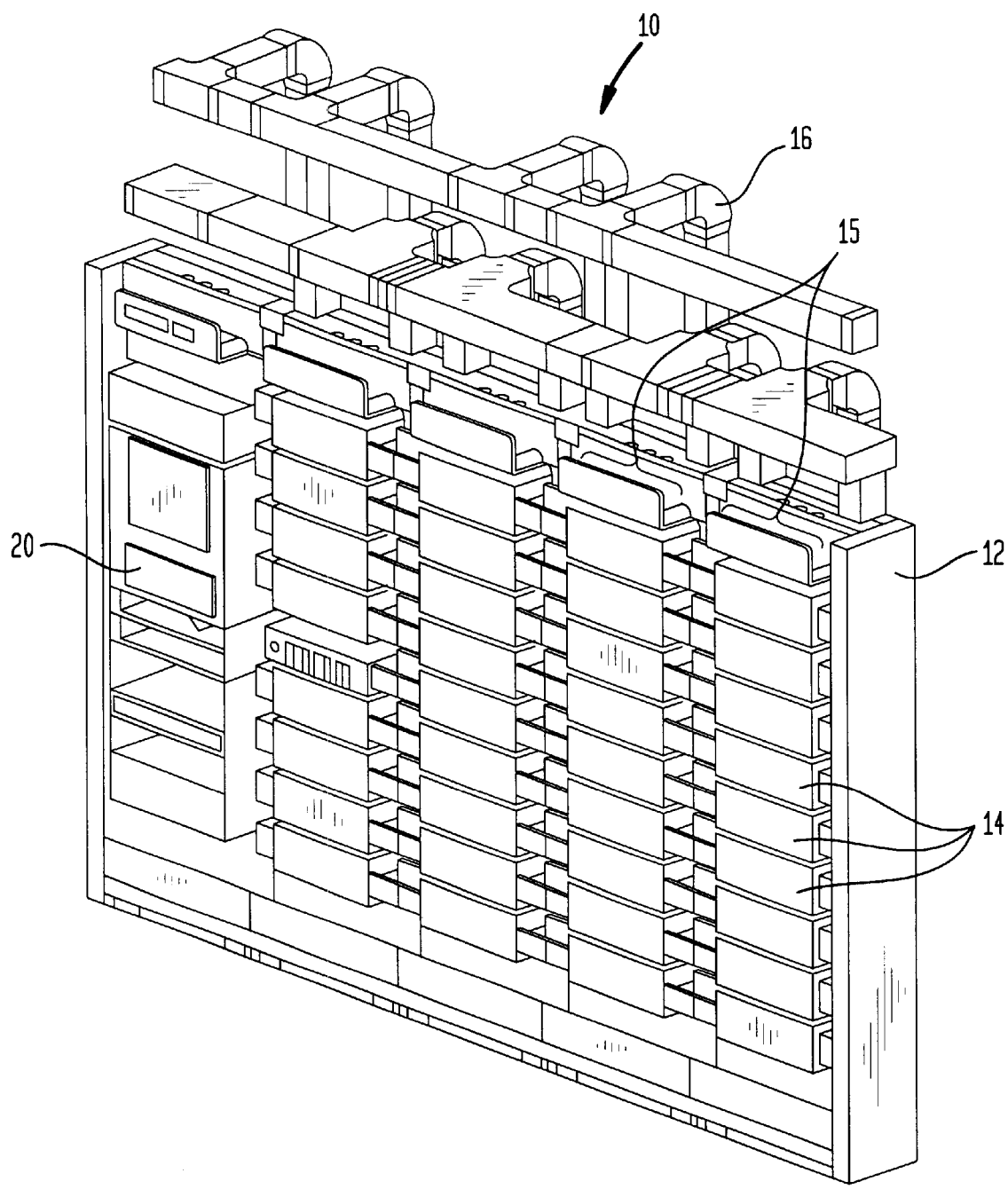
FIG. 1 is a perspective view of an optical fiber administration system containing a first plurality of bays and a second plurality of fiber distribution shelves in each bay.

In FIG. 1, a fiber administration system 10 is shown. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of three standard sizes, having a five inch height, a seven inch height or a nine inch height. A network of conduits 16 lead the various optical fibers from the optical fiber network to the fiber distribution shelves 14.

Figure 2:
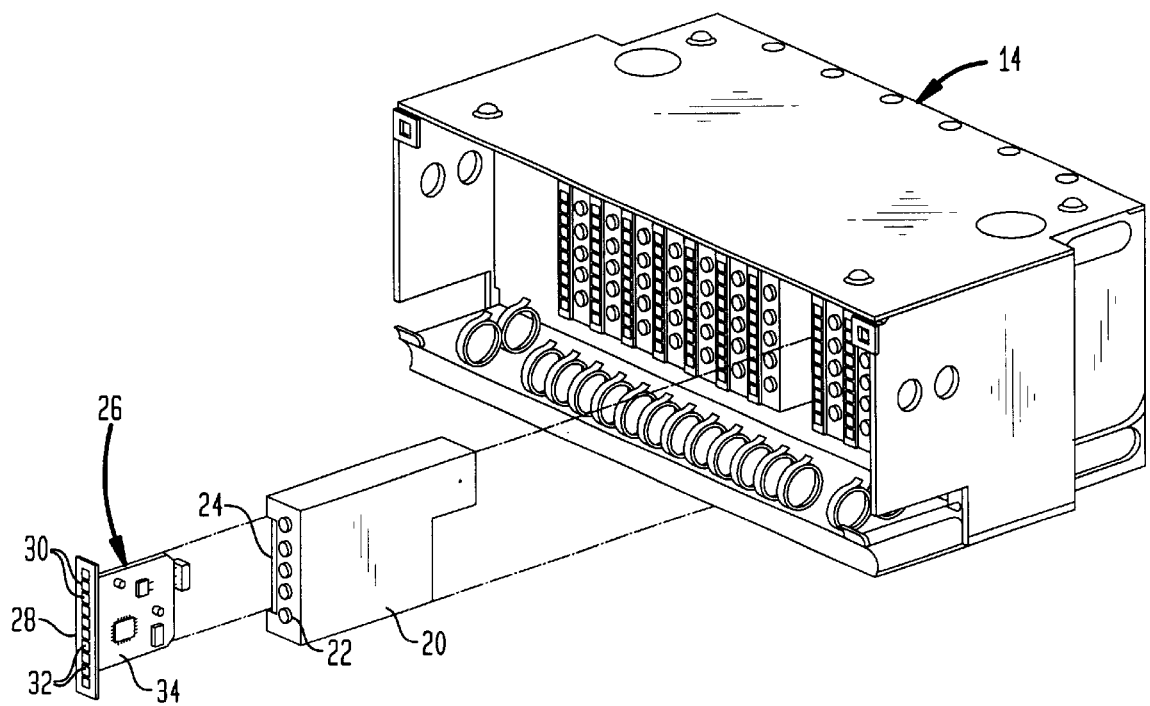
FIG. 2 is an exploded perspective view of a fiber distribution shelf that contains connector modules that contain upgrade tracing assemblies.

Referring to FIG. 2, it can be seen that each of the fiber distribution shelves 14 contain a plurality of upgradeable connector modules 20. Each of the upgradeable connector modules 20 contains a plurality of optical connector ports 22, such as those used in the prior art. However, positioned next to the optical connector ports 22 is a vertically oriented receptacle 24. Normally, the open end of the receptacle 24 can be closed with a removable cover (not shown). If a facility decides to add a connector port tracing system to the overall fiber administration system, the covers can be removed and upgrade trace assemblies 26 can be added to the receptacles 24.

The upgrade trace assemblies 26 include a faceplate 28 that covers the receptacles 24 in the connector module 20. Disposed on the faceplate 28 are a plurality of view ports in which LEDs 30 are located. The position of each of the LEDs 30 on the faceplate 28 corresponds in position to each of the optical connector ports 22 in the connection modules 20. Accordingly, when the upgrade trace assemblies 26 are added to the connector modules 20, an LED 30 is positioned adjacent to each of the optical connector ports 22.

Optional manual trace request buttons 32 may also be present on the faceplate 28 of the upgrade trace assemblies 26. A manual trace request button 32 is located proximate each of the LEDs 30. The manual trace request buttons can be used by a technician to initiate a backward trace from a specific optical connector port back into the fiber administration system so as to locate the opposite termination of the optical fiber leading to that optical connector port.

A circuit board 34 extends behind the faceplate 28. The circuit board 34 contains the circuitry needed to selectively address and light the LEDs 30 when connection port tracing software is run by the systems controller of the fiber administration system. The circuitry embodied on the circuit board 34 is similar to the circuitry present in prior art connector modules of fiber administration systems manufactured with integral connector port tracing systems.

Figure 3:
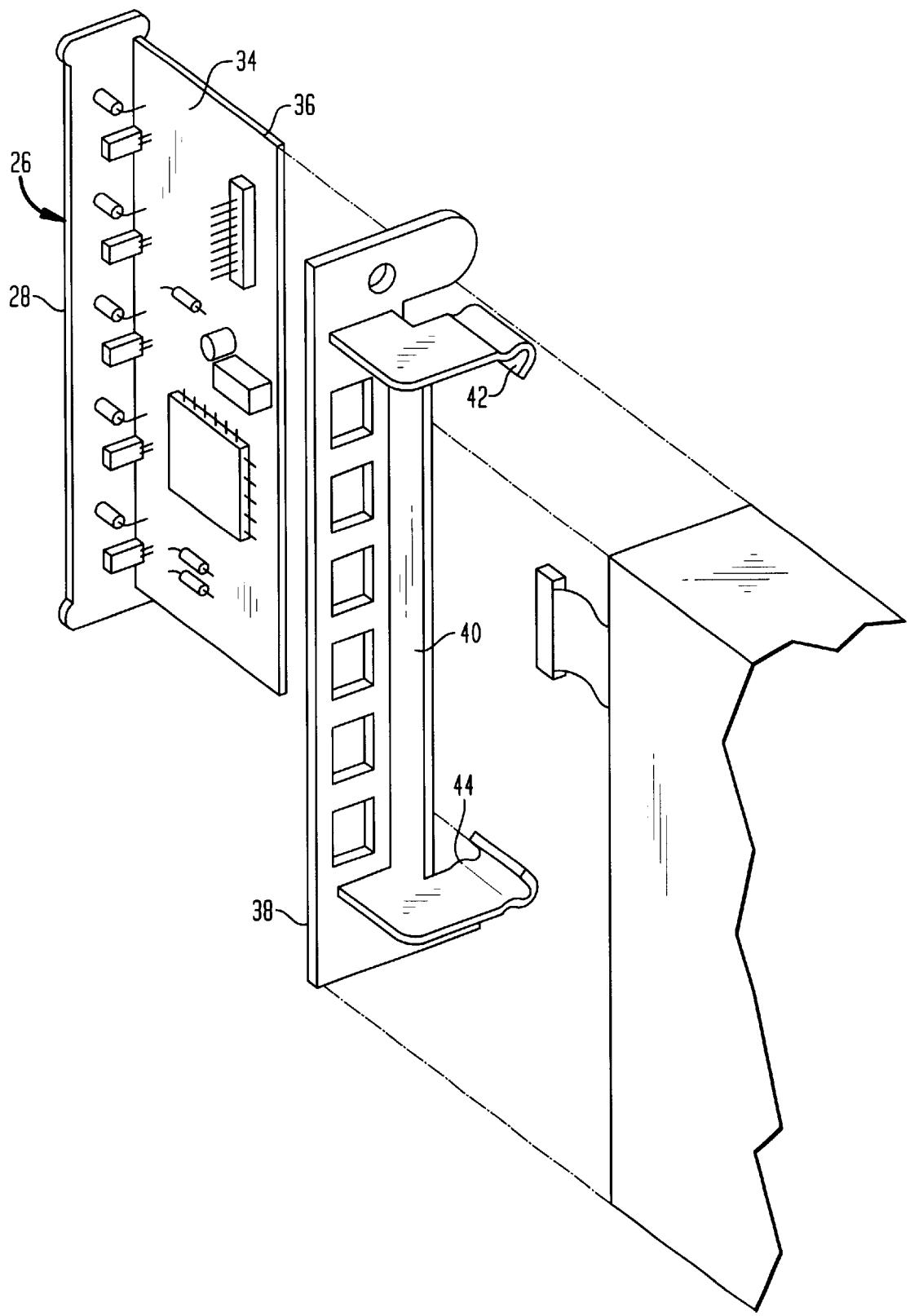
FIG. 3 is an exploded perspective view of a connector module and upgrade tracing assembly.

Referring to FIG. 3, it can be seen that a cable extends from the circuitry of the connector module 20. The cable is connect to the circuit board 34 of the upgrade tracing assembly 26, thereby interconnecting the circuit board of the upgrade tracing assembly 26 to the connector module 20. Once the connection is made between the upgrade tracing assembly 26 and the connector module, power and command signals can be fed to the upgrade tracing assembly 26.

In order for the electrical connector 36 on the upgrade tracing assembly 26 to properly enter the receptacle in the connector module 20, the circuit board 34 of the upgrade tracing assembly 26 must be guided into position. In FIG. 3, it can be seen that the front plate 38 of the connector module 20 contains an internal bracket 40. The internal bracket 40 defines an upper and lower groove 42, 44 that engages the upper edge and the lower edge of the circuit board 34, respectively. The internal bracket 40 therefore retains the circuit board 34 of the upgrade tracing assembly 26 into a set plane that places the electrical connector board 36 into the proper orientation.

It will be understood that the embodiment of the present invention specifically shown and described is merely exemplary and that a person skilled in the art can make alternate embodiments using different configurations and functionally equivalent components. For example, there can be many different shaped brackets that retain the upgrade tracing assembly into place within a connector module. All such alternate embodiments are intended to be included in the scope of this invention as set forth in the following claims.

What is claimed is:

1. An assembly for use in a fiber administration system having an optical filter tracing system, said assembly comprising:
   a connector module having a plurality of aligned optical connector ports and having a receptacle; and
   an upgrade tracing module containing a plurality of light emitting devices and having a circuitboard, said upgrade tracing module slidingly interfitted to said connector module by means of said receptacle retaining and guiding said circuitboard into a set plane to position at least one of said light emitting devices aligned proximate each said optical connector port.

2. The assembly according to claim 1, wherein upgrade tracing module electrically interconnects with said connector module when said upgrade tracing module is connected to said connector module.

3. The assembly according to claim 1, wherein said connector module has a front surface and said upgrade tracing module has a faceplate, wherein said faceplate of said upgrade tracing module lays flush against said front surface of said connector module when said upgrade tracing module is connected to said connector module.

4. The assembly according to claim 1, wherein the fiber administration system has a central controller and said upgrade module contains control circuitry that enables the central controller to control said plurality of light detecting devices when said upgrade module is connected to said connector module.

5. The assembly according to claim 1, wherein said upgrade module contains a manual trace request button for each of said plurality of light detecting devices contained thereon.

6. In a fiber administration system having a central controller, a plurality of fiber distribution shelves and a plurality of connector modules on each of the fiber administration shelves, an improved connector module comprising:
   a plurality of aligned fiber connector ports,
   a receptacle disposed proximate said fiber connector ports, wherein said receptacle has opposed grooves, spaced apart a predetermined distance, and configured to slidingly retain and guide an assembly with light emitting devices that can be controlled to provide an optical fiber tracing system by the central controller to align at least one of said light emitting devices proximate each of said fiber connector ports.

7. The module according to claim 6, further including a bracket disposed in said receptacle for engaging and guiding a circuit board into a set position when a circuit board is inserted into said receptacle.

8. A method of retroactively adding an optical fiber tracing capability to a fiber administration system, where the fiber administration system contains a systems controller, and a plurality of connector modules, each of the connector modules having a plurality of fiber connector ports and having receptacles, said method comprising the steps of:

providing a plurality of tracing modules, wherein said tracing modules contain a plurality of light indicators and a circuitboard, attaching one of said tracing modules to each of said plurality of connector modules by retaining and guiding the circuitboard of one of the tracing modules within a receptacle of a connector module and sliding said circuitboard of said tracing module into the receptacle of a connector module to align at least one of said light indicators proximate to each of the fiber connector ports, interconnecting each of said tracing modules to the systems controller through said connector modules, and wherein the system controller can selectively control the lights contained within the tracing module.

9. The method according to claim 8, wherein said connector modules contain receptacles and said step of attaching said tracing element to said includes inserting a tracing module into the receptacle.

10. The method according to claim 8, wherein each of the connector modules contains a plurality of optical connector ports and said step of attaching said tracing modules to said connector module positions a light emitting device from a tracing module proximate each of said optical connector ports.

11. The method according to claim 8, wherein said step of interconnecting each of said tracing modules to the systems controller includes the substep of electrically interconnecting each tracing module to the connector module to which it is attached.

12. A fiber administration system for connecting between fiberoptic communication systems, said fiber administration system comprising:

a plurality of connector modules coupled to a central controller, wherein each connector module contains a plurality of aligned optical connector ports, each of said connector modules having a receptacle;

an upgrade tracing assembly for the connector modules, said upgrade tracing assembly having a circuitboard, and having a plurality of light emitting devices in an aligned orientation;

said upgrade tracing assembly slidingly retained to said connector modules by said circuitboard interfifting with said receptacle to position at least one of said aligned light emitting devices aligned proximate each aligned optical connector port;

control circuitry that enables the central controller of the fiber administration system to control said plurality of light emitting devices to provide an optical fiber tracing system, and an electrical interface that electrically interconnects the control circuitry to the control module, whereby the central controller can interact with the control circuitry through the connector module.

13. The assembly according to claim 12, wherein said control circuitry, said plurality of light emitting devices and said electrical interface are disposed on a common circuit board.

* * * * *